(12) United States Patent
Moley (10) Patent No.: US 11,460,054 B2
(45) Date of Patent: Oct. 4, 2022

(54) GENERATOR MOTOR FLOW CONTROL VALVE

(71) Applicant: MOLEY MAGNETICS, INC., Lockport, NY (US)

(72) Inventor: John S. Moley, Lockport, NY (US)

(73) Assignee: Moley Magnetics, Inc., Lockport, NY (US)

( * ) Notice: Subject to any disclaimer, the term of this patent is extended or adjusted under 35 U.S.C. 154(b) by 0 days.

(21) Appl. No.: 17/394,001

(22) Filed: Aug. 4, 2021

(65) Prior Publication Data

US 2022/0042525 A1 Feb. 10, 2022

Related U.S. Application Data (60) Provisional application No. 63/060,888, filed on Aug. 4, 2020.

(51) Int. Cl.
*F15B 13/08* (2006.01)
*F15B 13/02* (2006.01)
(Continued)

(52) U.S. Cl.
CPC ........ *F15B 13/0807* (2013.01); *F15B 13/023* (2013.01); *F15B 13/024* (2013.01);
(Continued)

(58) Field of Classification Search
CPC ...... F15B 2211/305; F15B 2211/40569; F15B 2211/415; F15B 2211/50518;
(Continued)

(56) References Cited

U.S. PATENT DOCUMENTS

| 6,647,721 B2 * | 11/2003 | Heyne .................... B60T 17/04 60/468 |
| 9,239,065 B2 * | 1/2016 | Zaleski .................... F02N 9/04 |
| 2010/0252644 A1 | 10/2010 | Elliot |

FOREIGN PATENT DOCUMENTS

| CN | 108397428 | 8/2018 |
| DE | 3216580 | 2/1983 |

OTHER PUBLICATIONS

Rodriquez, Kari, "PCT International Search Report and Written Opinion of the International Searching Authority", PCT International Application No. PCT/US21/44507 filed on Aug. 4, 2021, dated Nov. 17, 2021, United Statement Patent and Trademark Office, Alexandria, VA (10 pages).

* cited by examiner

*Primary Examiner* — Thomas E Lazo
(74) *Attorney, Agent, or Firm* — Woods Oviatt Gilman LLP; Dennis B. Danella, Esq.

(57) ABSTRACT

A flow control manifold apparatus includes a housing defining a first flow path from a flow input port to flow output port and a second flow path from a return inlet port to a return outlet port. A first flow regulating valve is placed inline the first flow path and an excess flow path fluidly couples the first flow path to the second flow path. An excess pressure valve is placed inline the excess flow path and is in a closed orientation when the first flow regulating valve is open so that all of the fluid exits through the flow output port. The excess pressure valve is then in a partially open orientation when the first flow regulating valve is partially closed so that a first portion of the fluid exits through the flow output port and a second portion of the fluid exits through the return outlet port.

8 Claims, 7 Drawing Sheets

(51) Int. Cl.
 *F16K 17/10* (2006.01)
 *F15B 13/04* (2006.01)
(52) U.S. Cl.
 CPC ............ *F16K 17/105* (2013.01); *F15B 13/04* (2013.01); *F15B 2211/415* (2013.01)
(58) Field of Classification Search
 CPC ........ F15B 2211/5159; F15B 2211/528; F15B 2211/575
 See application file for complete search history.

GENERATOR MOTOR FLOW CONTROL VALVE

CROSS REFERENCE TO RELATED APPLICATIONS

This application claims the benefit of U.S. Provisional Patent Application No. 63/060,888, Aug. 4, 2020, entitled GENERATOR MOTOR FLOW CONTROL VALVE, the entirety of which is incorporated herein by reference.

FIELD OF THE INVENTION

The present invention relates to a flow control valve, and more particularly to a flow control valve for use with a hydraulic generator motor, and still more particularly to a flow control valve for a hydraulic generator motor which automatically regulates flow output to the generator at a constant volume.

BACKGROUND OF THE INVENTION

Hydraulic power generators offer numerous advantages over their fuel-powered cousins. Hydraulic generators use hydraulic motors which utilize high pressure hydraulic fluid provided by an external source, such as a vehicle or other piece of construction equipment rather than a gas or diesel motor which requires a dedicated fuel source. As a result, hydraulic generators are about 50% smaller and lighter than fuel powered generators, Hydraulic generators also do not produce combustion materials or carbon exhaust allowing their use in constrained or enclosed locations. Lastly, hydraulic generators are quieter and more reliable than fuel powered generators and are also generally maintenance-free.

Nevertheless, despite the above numerous advantages, hydraulic generators do suffer a number of drawbacks. For instance, speed control of the hydraulic motor must be properly maintained to prevent damage to the generator and any tool, such as an electromagnet and associated controller, electrically coupled thereto. Such flow control typically uses an adjustable valve to set the output flow rate of the hydraulic fluid from the external source. However, each time the hydraulic generator is coupled to a different source, or should the output of the source be modified, the flow rate valve of the hydraulic generator must be recalibrated and reset so that the generator operates at the proper speed. Such adjustments may be time-consuming and require highly skilled personnel to perform, thus decreasing job efficiencies while increasing costs. Moreover, failure to properly adjust the speed of the generator may cause poor generator performance, create dangerous voltage conditions, and in a worst case scenario, lead to generator and/or tool damage requiring expensive repair which may cost thousands of dollars.

Thus, there is a need for a flow control valve for a hydraulic generator motor which automatically regulates flow output to the generator at a constant volume. The present invention addresses these, and other, needs.

BRIEF SUMMARY OF THE INVENTION

It is, therefore, an aspect of the present invention to provide a flow control manifold apparatus including a housing defining a first flow path from a flow input port to flow output port and a second flow path from a return inlet port to a return outlet port. A first flow regulating valve is placed inline the first flow path to regulate a flow rate of a fluid through the flow output port and an excess flow path fluidly couples the first flow path to the second flow path. An excess pressure valve is placed inline the excess flow path. The excess pressure valve is configured to be in a closed orientation when the first flow regulating valve is open whereby all of the fluid exits through the flow output port. The excess pressure valve is then configured to be in a partially open orientation when the first flow regulating valve is partially closed whereby a first portion of the fluid exits through the flow output port and a second portion of the fluid exits through the return outlet port.

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
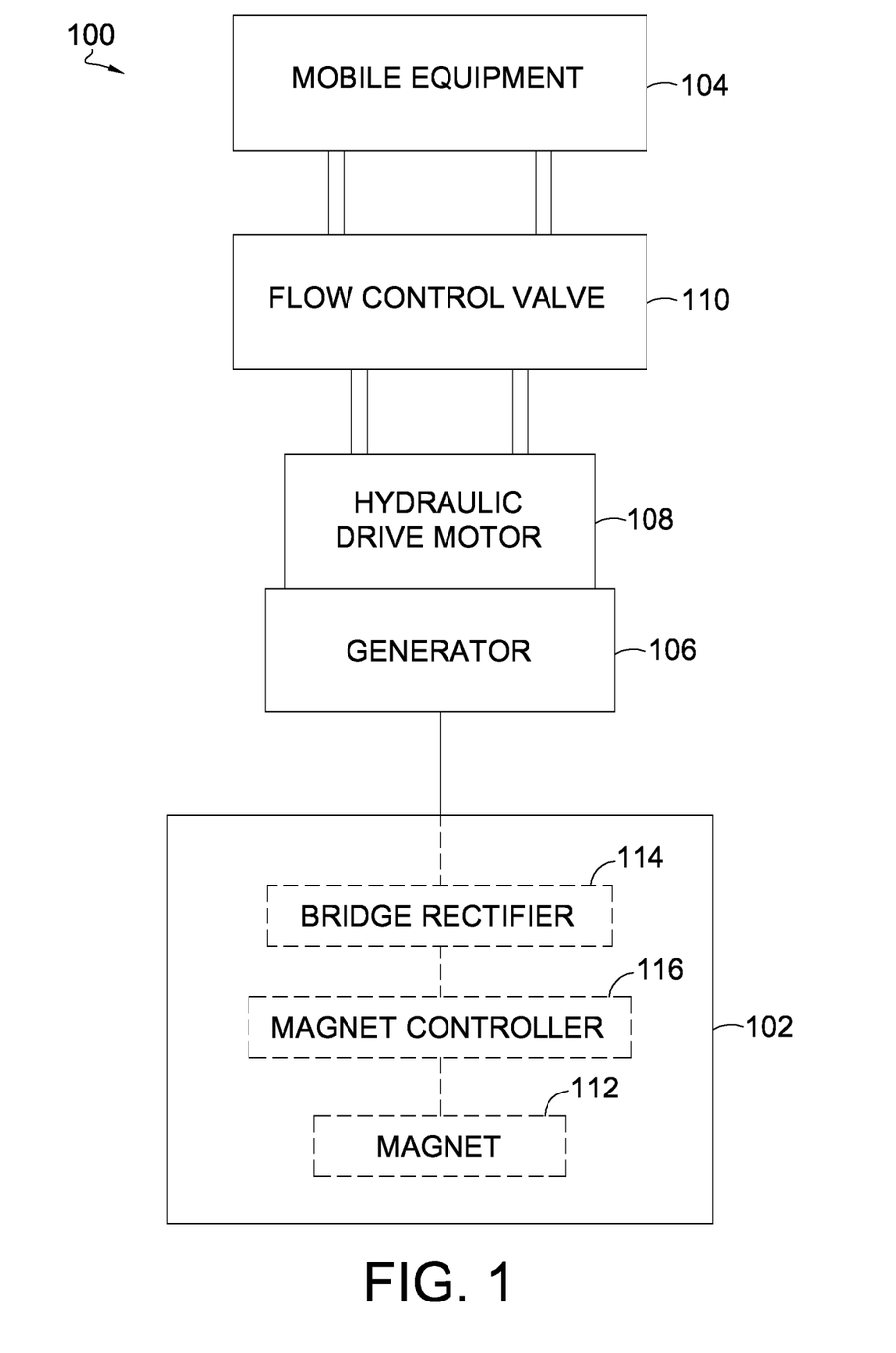
FIG. 1 is a block schematic diagram of an exemplary system suitable for use with an embodiment of a flow control valve in accordance with the present invention.
Figure 2:
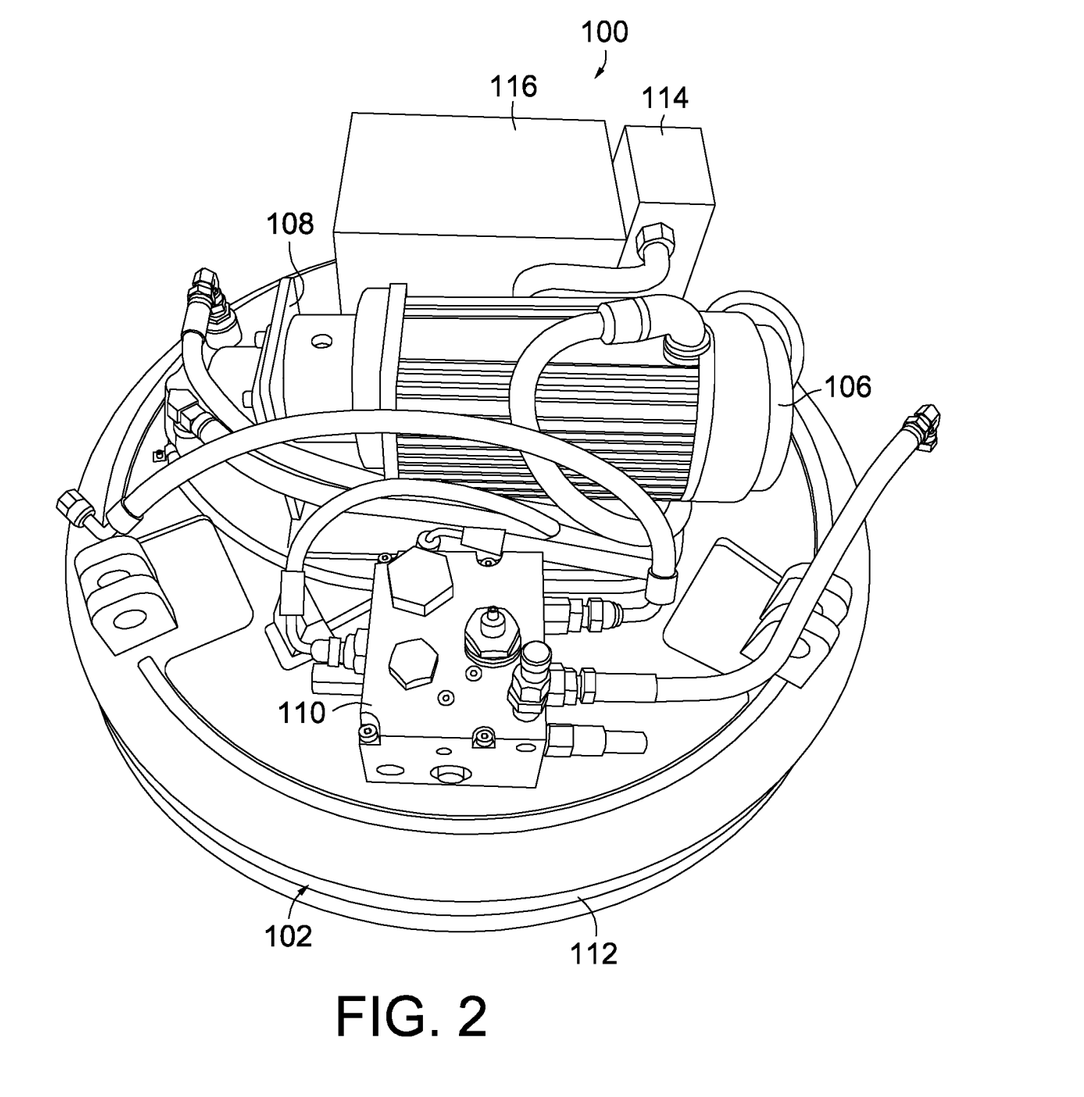
FIG. 2 is a schematic diagram of an exemplary system equipped with an embodiment of a flow control valve in accordance with the present invention.
Figure 3:
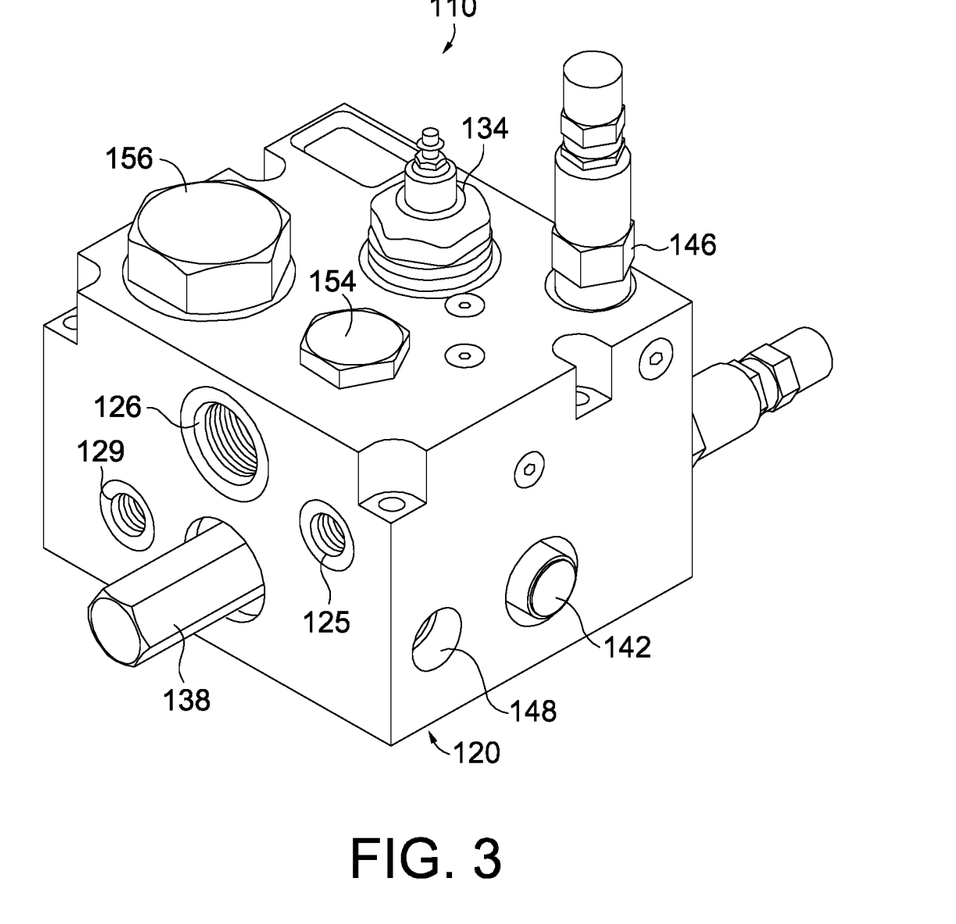
FIG. 3 is a front perspective view of an embodiment of a flow control valve in accordance with the present invention.
Figure 4:
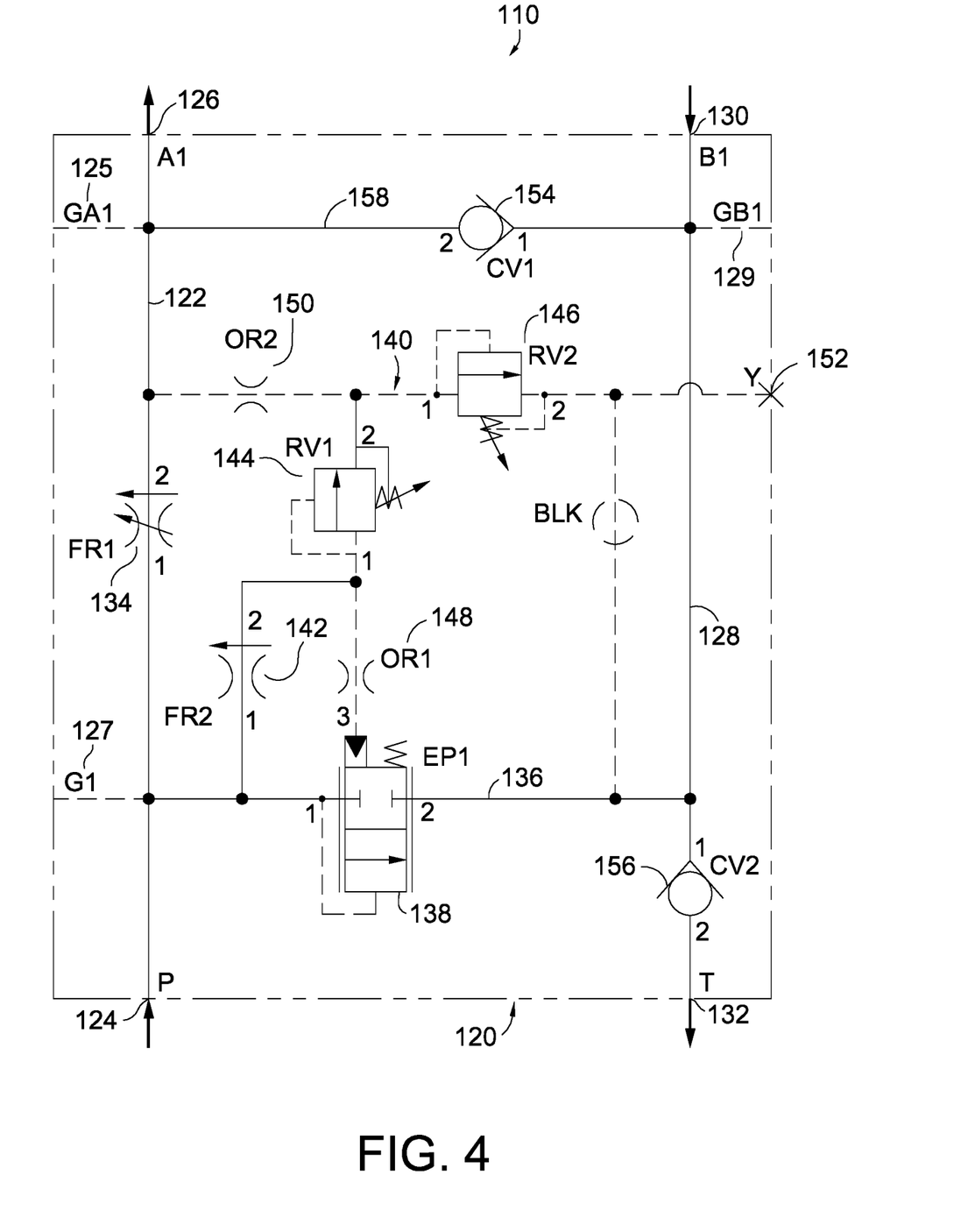
FIG. 4 is a flow diagram of the embodiment of a flow control valve shown in FIG. 3.
Figure 5:
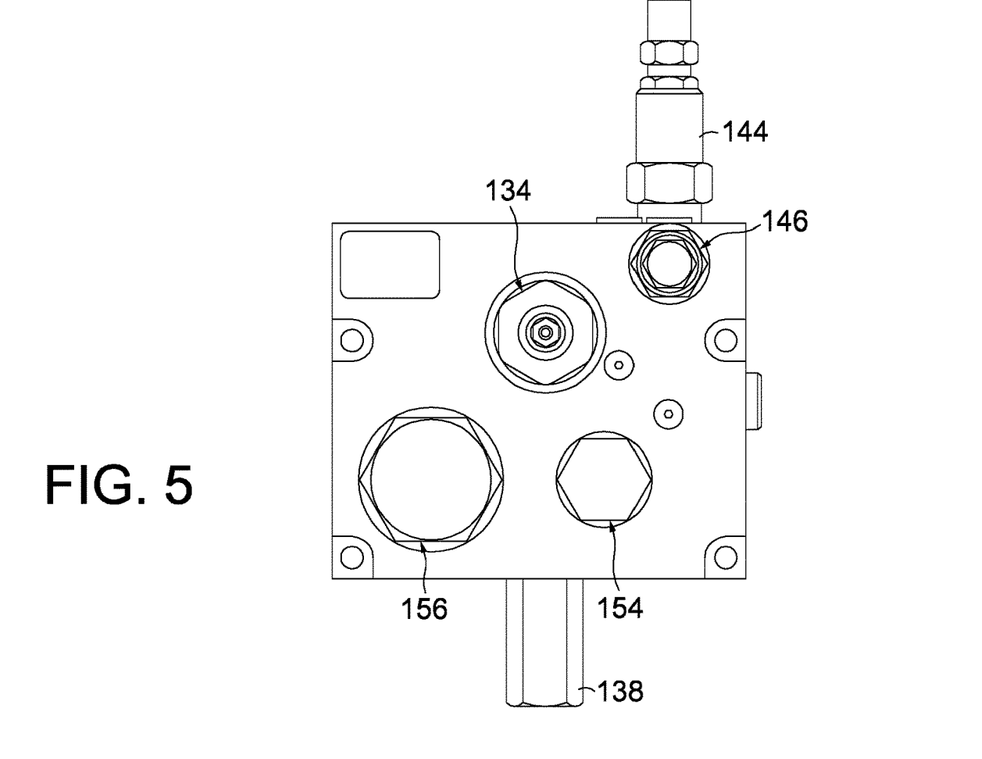
FIG. 5 is a top plan view of the embodiment of a flow control valve shown in FIG. 3.
Figure 6:
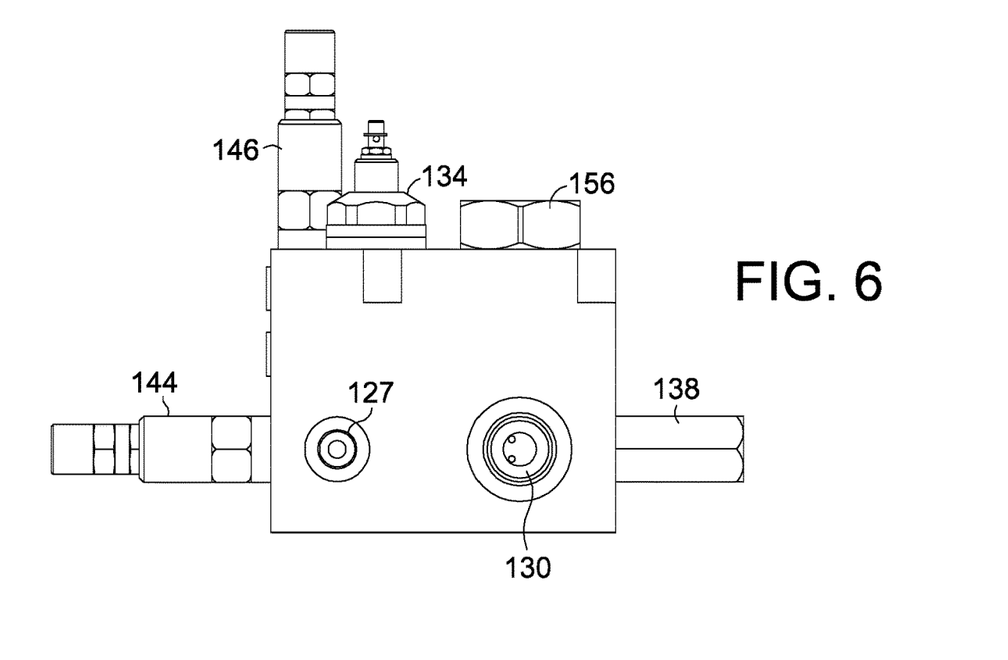
FIG. 6 is a left side plan view of the embodiment of a flow control valve shown in FIG. 3.
Figure 7:
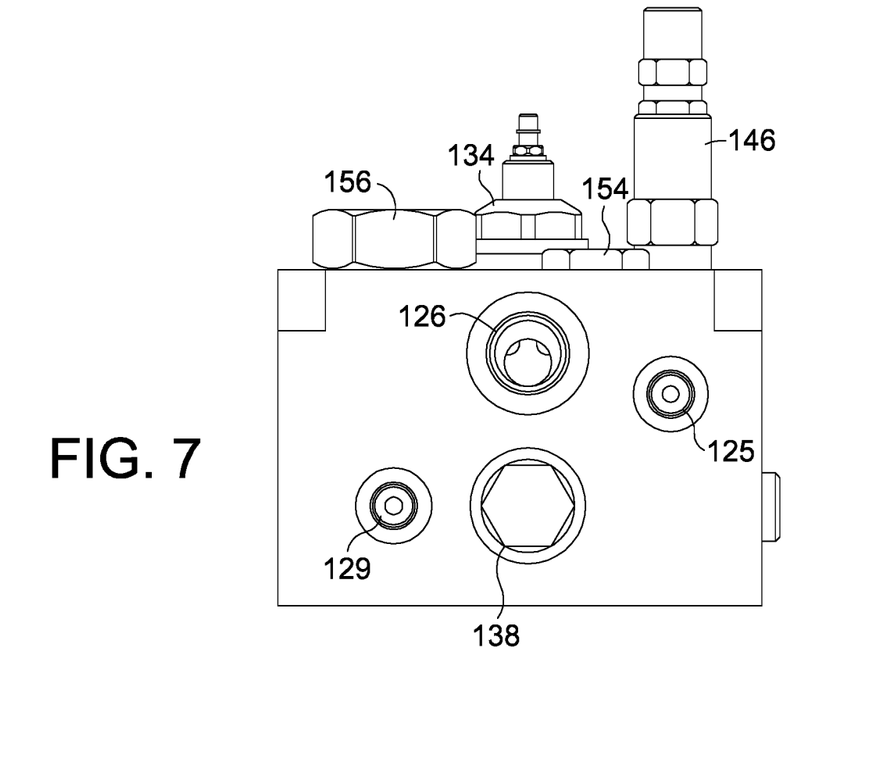
FIG. 7 is a front plan view of the embodiment of a flow control valve shown in FIG. 3.
Figure 8:
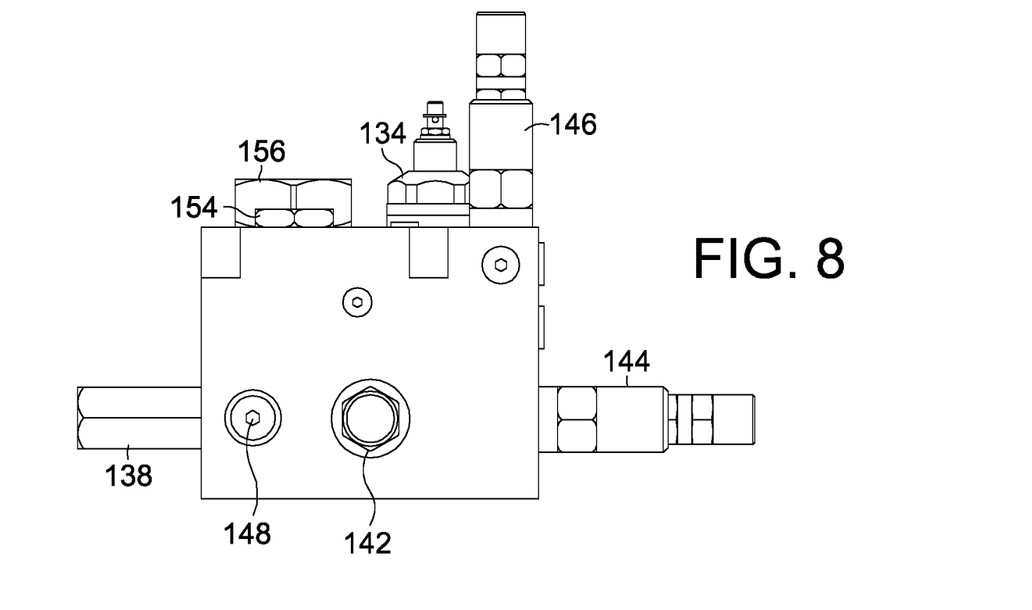
FIG. 8 is a right side plan view of the embodiment of a flow control valve shown in FIG. 3.
Figure 9:
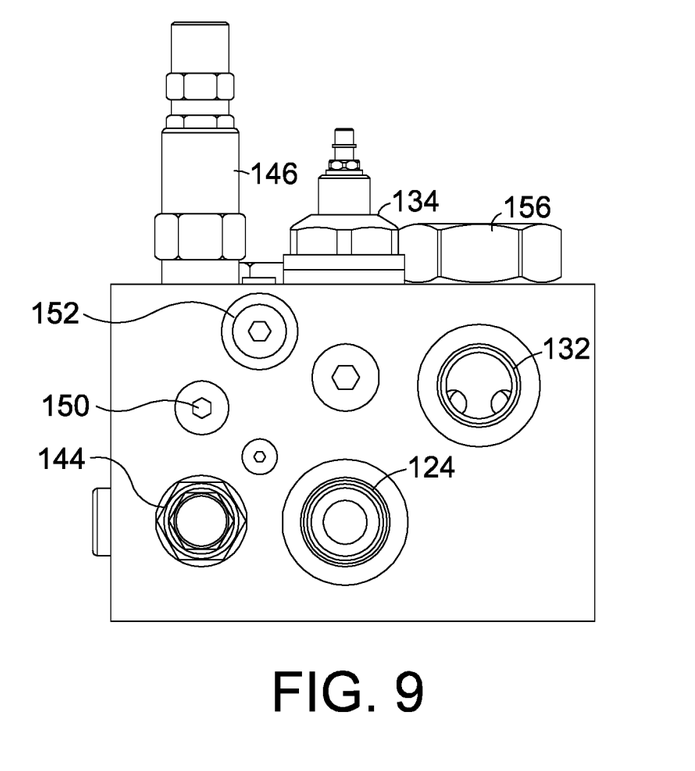
FIG. 9 is a back plan view of the embodiment of a flow control valve shown in FIG. 3.

With reference to FIGS. 1-2, an exemplary system 100 includes a tool 102 configured to mount onto or be otherwise actuated by a machine or piece of equipment 104 via a generator 106 driven by a hydraulic drive motor 108. By way of example and without limitation thereto, machine 104 may be a vehicle or other piece of construction equipment, such as an excavator, backhoe, skid steer or the like, having appropriate connections for supplying pressurized hydraulic fluid to drive motor 108. In accordance with an aspect of the present invention, a flow control valve 110 may be placed inline between machine 104 and drive motor 108 so as to regulate the flow rate of the hydraulic fluid being provided to the drive motor. Generator 106 may then convert the hydraulic flow to electrical power and output either DC or AC power for use by tool 102, depending upon the system requirements.

In an exemplary embodiment of the present invention, tool 102 may be an electromagnet 112 while generator 106 is an AC generator. Flow control valve 110 regulates hydraulic flow to drive motor 108 such that generator 106 turns at the proper, constant speed to deliver the desired voltage to bridge rectifier 114. Bridge rectifier then converts the AC power to DC power for delivery to magnet control unit 116, which in turn supplies DC power to electromagnet 112 to create the desired magnetic field for the attraction of ferrous metals thereto.

In a further aspect of this exemplary embodiment, flow control valve 110 may stop the flow of hydraulic fluid to drive motor 108, thereby stopping drive motor 108 from turning, which in turn stops the flow of current to bridge rectifier 114 and opens magnet control unit 116. Reverse current may then flow out of electromagnet 112 into magnet control unit 116 thereby triggering the magnet control unit 116 to reverse polarity which causes electromagnet 112 to create the opposite polarity at a reduced voltage so as to repel the ferrous magnetic material from electromagnet 112. As will be described in more detail below, the above operation of electromagnet 112 may occur without damage to generator 106 or magnet control unit 116 due to the controlled flow rate of hydraulic fluid provided to drive motor 108 through flow control valve 110.

Turning now to FIGS. 3-9, flow control valve 110 generally comprises a housing 120 defining a first flow path 122 from a flow input port 124 to a flow output port 126 and a second flow path 128 from a return inlet port 130 to a return outlet port 132. Flow input port 124 is configured to couple with a mating fitting on machine 104 whereby machine 104 pressurized hydraulic fluid may be introduced into flow control valve 110. Flow output port 126 is coupled to hydraulic drive motor 108 so as to deliver the high pressure hydraulic fluid to the motor and turn generator 106 as described above. A first flow regulating valve 134 is placed inline first flow path 122 to control the flow rate of the hydraulic fluid exiting flow output port 126, In one aspect of the present invention, first flow regulating valve 134 is configured to output a specific output flow rate to flow output port 126 irrespective the input flow rate of the hydraulic fluid received at flow input port 124.

By way of example and without limitation thereto, first flow regulating valve 134 may be selected to control the output flow rate to 14.5 gallons per minute (GPM). Should machine 104 supply hydraulic fluid to flow control valve 110 having a flow rate of at least 14.5 GPM, flow control valve 110 will provide hydraulic fluid to drive motor 108 at a flow rate of 14.5 GPM, Thus, no matter the machine 104 hydraulic fluid flow rate (e.g., 20 GPM or 30 GPM or 40 GPM, etc.), first flow regulating valve 134 will restrict flow to the desired flow rate (i.e., 14.5 GPM in this example). As a result, generator 106 is turned at a constant, controlled speed so as to produce a current having a constant and controlled voltage. Flow control valve 110 may be selectively adjustable so as to enable setting of the output flow rate to a user-defined value.

Housing 120 of flow control valve 110 may also define an excess flow path 136 which couples first flow path 122 to second flow path 128. An excess pressure valve 138 may be placed inline excess flow path 136. In accordance with an aspect of the present invention, excess pressure valve 138 may be a logic valve. With continued reference to the above example, port 127 monitors the input pressure of the hydraulic fluid from machine 104 while port 125 monitors outflow pressure from flow output port 126 to drive motor 108. If the input flow rate is substantially equal to the outflow flow rate, the pressure difference between ports 125 and 127 would be negligible. As a result excess pressure valve 138 would remain close. However, should the input flow rate exceed the output flow rate, excess flow of hydraulic fluid from machine 104 will not pass through first flow regulating valve 134 and will increase the fluid pressure within first flow path 122 between flow inlet port 124 and first flow regulating valve 134. Once the pressure differential between ports 125 and 127 caused by the increased pressure overcomes the predetermined set pressure of excess pressure valve 138, excess pressure valve 138 will open whereby the excess hydraulic fluid flow may traverse excess flow path 136 and exit flow control valve 110 through return outlet port 132 so as to be returned to the fluid tank on machine 104.

Housing 120 may also include a pilot operated relief valve (PORV) circuit 140 configured to relieve flow control valve 110 of hydraulic fluid having an excess pressure immediately prior to exiting flow output port 126 for delivery to drive motor 108. PORV circuit 140 includes excess pressure valve 138, along with a second flow regulating valve 142, first relief valve 144 and second relief valve 146, and first reducing orifice 148 and second reducing orifice 150. Thus, if hydraulic fluid pressure exceeds a predetermined threshold, second release valve 146 may act as a pilot and cause excess pressure valve 138 to open and to redirect hydraulic fluid from flow inlet port 124 to return outlet port 132 to thereby relieve pressure within first flow path 122. Second flow regulating valve 142 provides a constant, low-flow supply of hydraulic fluid to PORV circuit 140, while first reducing orifice 148 operates to dampen the spool movement of excess pressure valve 138. Second reducing orifice 150 limits the amount of flow into and out of PORV circuit 140 while low pressure port 152 provides a separate return line to the fluid tank on machine 104.

Housing 120 may further include first and second check valves 154, 156, respectively. First check valve 154 acts as a spin down check valve allowing hydraulic fluid to circulate from return inlet port 130 to flow outlet port 126 so that drive motor 108 and generator 106 may spin down slowly when flow of hydraulic fluid from the tank of machine 104 is stopped or interrupted. That is, when input flow from machine 104 is stopped or otherwise interrupted, the pressure of the hydraulic fluid within first flow path 122 decreases rapidly as the hydraulic fluid is provided to the drive motor 108 without being replaced by machine 104. As such, the pressure of the hydraulic fluid being received from drive motor 108 at return inlet port 130 is substantially higher than that exiting through flow output port 126. As a result, hydraulic fluid at port 129 possesses sufficient pressure to overcome the preload force of first check valve 154. Therefore, a portion of the hydraulic fluid from return inlet port 130 recirculates within housing 120 via spin down flow path 158 to flow output port 126. The recirculating flow thereby allows drive motor 108 to gently spin down upon loss of supply pressure to flow input port 124. During normal operation, the fluid pressure within first flow path 122 would be equal to or slightly greater than the return flow pressure with second flow path 128, thereby causing check valve 154 to remain in the closed orientation. Second check valve operates as a safety valve and prevents operation of the drive motor 108 should flow control valve 110 be improperly couple to machine 104 and/or drive motor 108.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A flow control manifold apparatus comprising:
 a) a first flow path from a flow input port to a flow output port, and a second flow path from a return inlet port to a return outlet port;
 b) a first flow regulating valve inline said first flow path to regulate a flow rate of a fluid through said flow output port;
 c) an excess flow path fluidly coupling said first flow path to said second flow path; and
 d) an excess pressure valve inline said excess flow path wherein said excess pressure valve is configured to be in a closed orientation when said first flow regulating valve is open whereby all of the fluid exits through said flow output port, and wherein said excess pressure valve is configured to be in a partially open orientation when said first flow regulating valve is partially closed whereby a first portion of the fluid exits through said flow output port and a second portion of said fluid exits through said return outlet port.

2. The flow control manifold apparatus of claim 1 further comprising a pilot operated relief valve circuit including said excess pressure valve and a relief valve, wherein when a fluid pressure of said fluid exceeds a predetermined threshold, said relief valve causes said excess pressure valve to open to direct fluid through said return outlet port.

3. The flow control manifold apparatus of claim 2 further comprising a second check valve located immediately upstream said return outlet port, wherein said second check valve prevents fluid from entering said second flow path through said return outlet port.

4. The flow control manifold apparatus of claim 1 further comprising a spin down flow path coupling said first flow path to said second flow path downstream said first flow regulating valve, wherein said spin down flow path includes a first check valve configured to open when a return fluid pressure of the fluid entering said return inlet port is greater than a flow fluid pressure of the fluid exiting said flow output port.

5. The flow control manifold apparatus of claim 4 further comprising a second check valve located immediately upstream said return outlet port, wherein said second check valve prevents fluid from entering said second flow path through said return outlet port.

6. The flow control manifold apparatus of claim 1 further comprising a second check valve located immediately upstream said return outlet port, wherein said second check valve prevents fluid from entering said second flow path through said return outlet port.

7. A flow control manifold apparatus for use with a hydraulic drive motor, wherein the flow control manifold apparatus receives a supply of high pressure hydraulic fluid and delivers a constant flow of the high pressure hydraulic fluid to a drive motor, the flow control manifold apparatus comprising:
 a) a manifold housing defining a first flow path from a flow input port to a flow output port, wherein said flow input port is fluidly coupled to the supply of high pressure hydraulic fluid and said flow output port is fluidly coupled to said drive motor and a second flow path from a return inlet port to a return outlet port, wherein said return inlet port is fluidly coupled to said drive motor and said return outlet port is fluidly coupled to the supply of high pressure hydraulic fluid;
 b) a first flow regulating valve inline said first flow path to regulate a flow rate of the high pressure hydraulic fluid through said flow output port to said drive motor;
 c) a pilot operated relief valve circuit comprising:
  i) an excess flow path fluidly coupling said first flow path to said second flow path;
  ii) an excess pressure valve inline said excess flow path wherein said excess pressure valve is configured to be in a closed orientation when said first flow regulating valve is open whereby all of the high pressure hydraulic fluid exits through said flow output port to said drive motor, and wherein said excess pressure valve is configured to be in a partially open orientation when said first flow regulating valve is partially closed whereby a first portion of the high pressure hydraulic fluid exits through said flow output port to said drive motor and a second portion of said high pressure hydraulic fluid exits through said return outlet port to the supply of high pressure hydraulic fluid; and
  iii) a relief valve, wherein when a fluid pressure of said high pressure hydraulic fluid exceeds a predetermined threshold, said relief valve causes said excess pressure valve to open to direct fluid through said return outlet port to the supply of high pressure hydraulic fluid; and
 d) a spin down flow path coupling said first flow path to said second flow path downstream said first flow regulating valve, wherein said spin down flow path includes a first check valve configured to open when a return fluid pressure of the fluid entering said return inlet port from said drive motor is greater than a flow fluid pressure of the fluid exiting said flow output port to said drive motor.

8. The flow control manifold apparatus of claim 7 further comprising a second check valve located immediately upstream said return outlet port, wherein said second check valve prevents fluid from entering said second flow path through said return outlet port.

* * * * *